United States Patent
Afsham et al.

(10) Patent No.: US 11,222,402 B2
(45) Date of Patent: Jan. 11, 2022

(54) ADAPTIVE IMAGE ENHANCEMENT

(71) Applicant: Aupera Technologies, Inc., Vancouver (CA)

(72) Inventors: Narges Afsham, Burnaby (CA); Yu Feng Liao, Vancouver (CA)

(73) Assignee: Aupera Technologies, Inc.

( * ) Notice: Subject to any disclaimer, the term of this patent is extended or adjusted under 35 U.S.C. 154(b) by 25 days.

(21) Appl. No.: 16/858,234

(22) Filed: Apr. 24, 2020

(65) Prior Publication Data

US 2021/0334937 A1 Oct. 28, 2021

(51) Int. Cl.
*G06T 3/40* (2006.01)
*G06K 9/62* (2006.01)
*G06K 9/20* (2006.01)
*G06K 9/00* (2006.01)

(52) U.S. Cl.
CPC ........ *G06T 3/4046* (2013.01); *G06K 9/00624* (2013.01); *G06K 9/2054* (2013.01); *G06K 9/6256* (2013.01)

(58) Field of Classification Search
CPC .............. G06T 3/4046; G06K 9/00624; G06K 9/2054; G06K 9/6256
See application file for complete search history.

(56) References Cited

U.S. PATENT DOCUMENTS

| | | | |
|---|---|---|---|
| 8,390,704 B2 | 3/2013 | Wang et al. | |
| 8,520,736 B2 | 8/2013 | Topiwala | |
| 8,594,464 B2 | 11/2013 | Liu | |
| 8,743,963 B2 | 6/2014 | Kanumuri et al. | |
| 9,230,303 B2 | 1/2016 | Kanaev et al. | |
| 9,652,829 B2 | 5/2017 | Yang et al. | |
| 2011/0235912 A1* | 9/2011 | Bigioi | G06K 9/00315 382/173 |
| 2017/0017831 A1* | 1/2017 | Rollend | G06T 5/40 |

* cited by examiner

*Primary Examiner* — Mark Roz
(74) *Attorney, Agent, or Firm* — Timothy T. Wang; Ni, Wang & Massand, PLLC

(57) ABSTRACT

A method of adaptive image enhancement, comprising, receiving a low resolution image, receiving at least one application constraint, detecting at least one scene within the low resolution image, detecting a plurality of regions of interest within the detected at least one scene, prioritizing the detected plurality of regions of interest, ranking the detected plurality of regions of interest based on the prioritization, determining an enhanceable subset of the plurality of regions of interest based on the ranking of the plurality of regions of interest and the at least one application constraint and enhancing the enhanceable subset of the plurality of regions of interest.

11 Claims, 15 Drawing Sheets

ADAPTIVE IMAGE ENHANCEMENT

BACKGROUND

Technical Field

The instant disclosure is related to image enhancement and specifically adaptive image enhancement based on intelligent decision making for hardware accelerated real-time applications.

Background

When a low resolution image is scaled up to display on larger monitors, the image quality decreases. This is referred to as selective upscaling of the low resolution image. The goal of selective upscaling is to generate a high resolution image from a low resolution one. Recently, deep learning algorithms have shown superior performance as compared to linear algorithms in terms of image quality. However, there is a trade-off between high resolution image quality and the image enhancement time. One possible solution is to adaptively enhance the image quality while scaling up the low resolution image within time constraints imposed by the application. In the disclosed algorithm, the network learns how to add residuals to hardware based image enhancement. The residual level and number of residuals added are determined based on predefined rules.

SUMMARY

A first example method of adaptive image enhancement, including at least one of, receiving a low resolution image, receiving at least one application constraint, detecting at least one scene within the low resolution image, detecting a plurality of regions of interest within the detected at least one scene, prioritizing the detected plurality of regions of interest, ranking the detected plurality of regions of interest based on the prioritization, determining an enhanceable subset of the plurality of regions of interest based on the ranking of the plurality of regions of interest and the at least one application constraint and enhancing the enhanceable subset of the plurality of regions of interest.

A second example method of adaptive image enhancement, including at least one of, receiving a low resolution image from an application, the application having at least one application constraint, receiving at least one model of the low resolution image, identifying at least one region of interest within the low resolution image based on the at least one model, initially prioritizing the at least one region of interest based on the application to an initial priority level and enhancing a resolution of the low resolution image based on the identified at least one region of interest and the prioritization of the at least one region of interest based on the at least one application constraint.

A third example method of adaptive image enhancement, including at least one of, receiving a low resolution image from an application, the application having a time constraint, receiving at least one model of the low resolution image, identifying at least one region of interest within the low resolution image based on the at least one model, initially prioritizing the at least one region of interest based on the application to an initial priority level, ranking the at least one region of interest based on the initial priority level, reassigning the initial priority level of the identified at least one region of interest to an enhanced test priority level, determining an enhancement time based on the enhanced test priority level, determining whether the time constraint is met wherein if the time constraint is not met, then reducing the enhanced test priority level of a lower ranked level region of interest until the time constraint is met and enhancing a resolution of the low resolution image based on the ranking of the at least one region of interest.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
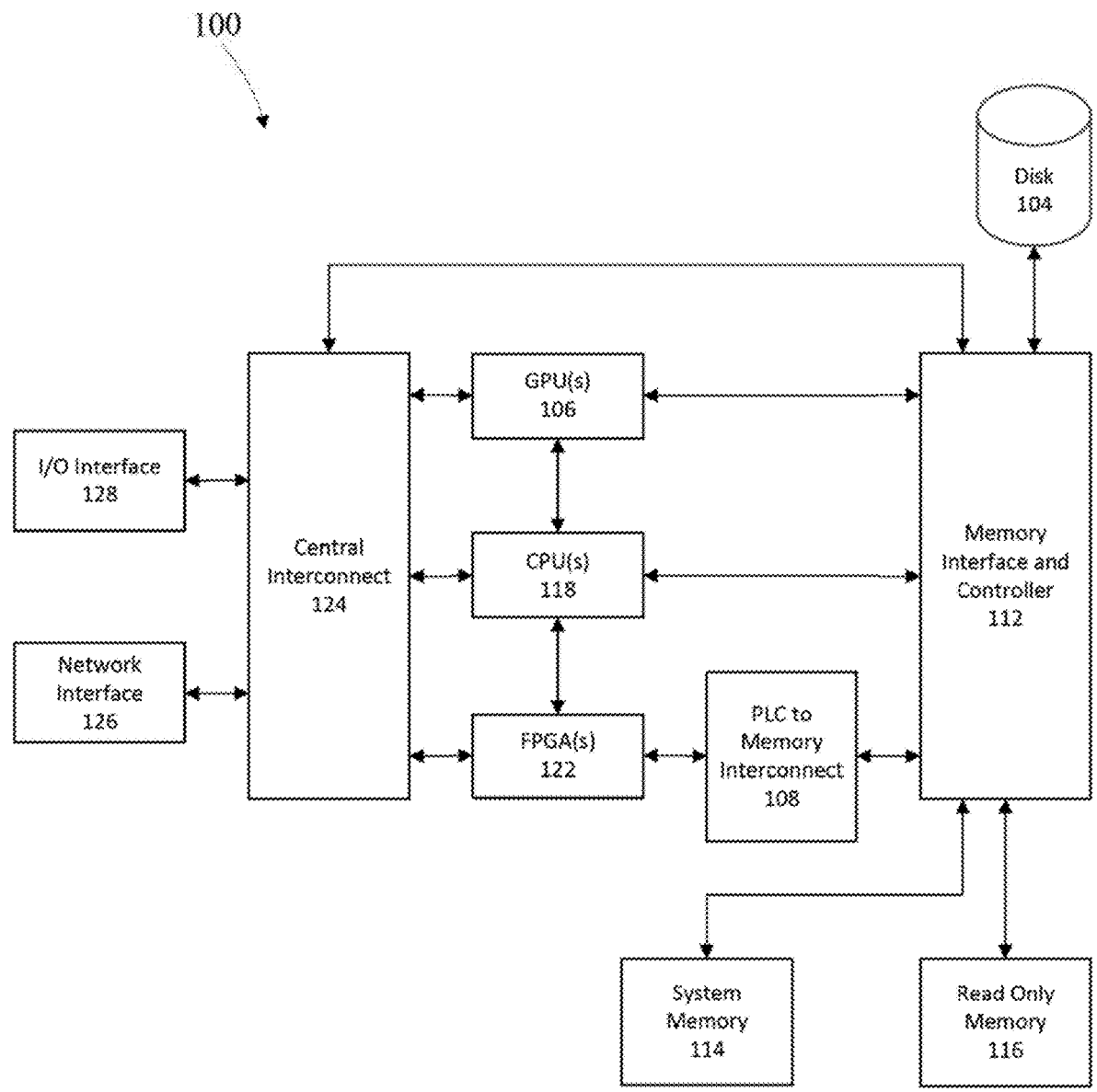
FIG. 1 is a first example system diagram in accordance with one embodiment of the disclosure.

FIG. 1 depicts an example hybrid computational system 100 that may be used to implement neural nets associated with the operation of one or more portions or steps of processes 300, 600, 1300, 1400 and 1500. In this example, the processors associated with the hybrid system comprise a field programmable gate array (FPGA) 122, a graphical processor unit (GPU) 106 and a central processing unit (CPU) 118.

The processing units 118, 106 and 122 have the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 106, central processing unit 118 and field programmable gate arrays 122 are connected to one other and are connected to a memory interface controller 112. The FPGA is connected to the memory interface through a programmable logic circuit to memory interconnect 108. This additional device is utilized due to the fact that the FPGA is operating with a very large bandwidth and to minimize the circuitry utilized from the FPGA to perform memory tasks. The memory and interface controller 112 is additionally connected to persistent memory disk 104, system memory 114 and read only memory (ROM) 116.

Figure 2:
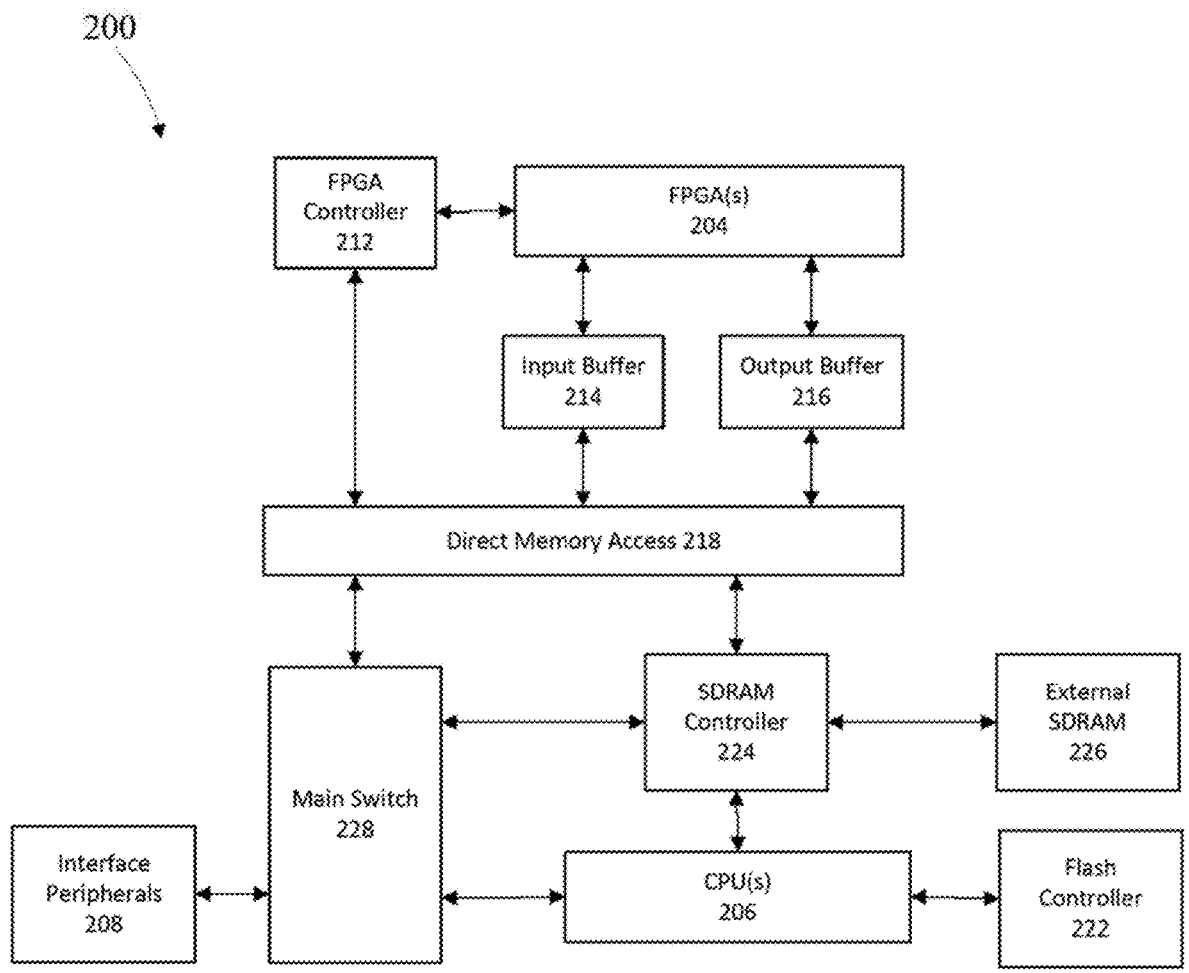
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 106, CPU 118 and FPGA 122. The central interconnect 124 is additionally connected to the input and output interface 128 and the network interface 126.

FIG. 2 depicts a second example hybrid computational system 200 that may be used to implement neural nets associated with the operation of one or more portions or steps of process 600. In this example, the processors associated with the hybrid system comprise a field programmable gate array (FPGA) 204 and a central processing unit (CPU) 206.

The FPGA is electrically connected to an FPGA controller 212 which interfaces with a direct memory access (DMA) 218. The DMA is connected to input buffer 214 and output buffer 216, both of which are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 206, the SDRAM controller is also connected to external SDRAM 226 and the CPU 206. The main switch 228 is connected to the peripherals interface 208. A flash controller 222 controls persistent memory and is connected to the CPU 206.

The disclosure illustrates examples of a hardware-accelerated method to adaptively enhance the frame resolution of a low resolution input to a selectively high resolution output with the ultimate goal of optimizing user experience. The method receives a low resolution input image and user constraints, recognizes the application domain based on pre-trained models and detects the region of interests based on that specific application. An intelligent optimizer determines which regions of interest are enhanced hierarchically.

The disclosure pertains to an adaptive method of increasing image quality from a lower resolution to higher resolution in selected regions of interest targeted for real-time applications. The selectively resolution enhanced algorithm may be deep learning based and may be designed for hardware acceleration. Enhanced image quality is obtained by adding residuals to the low resolution image and may be obtained by highlighting the detected features of the lower resolution region. The method balances a trade-off between user experience and computational time budget.

Figure 3:
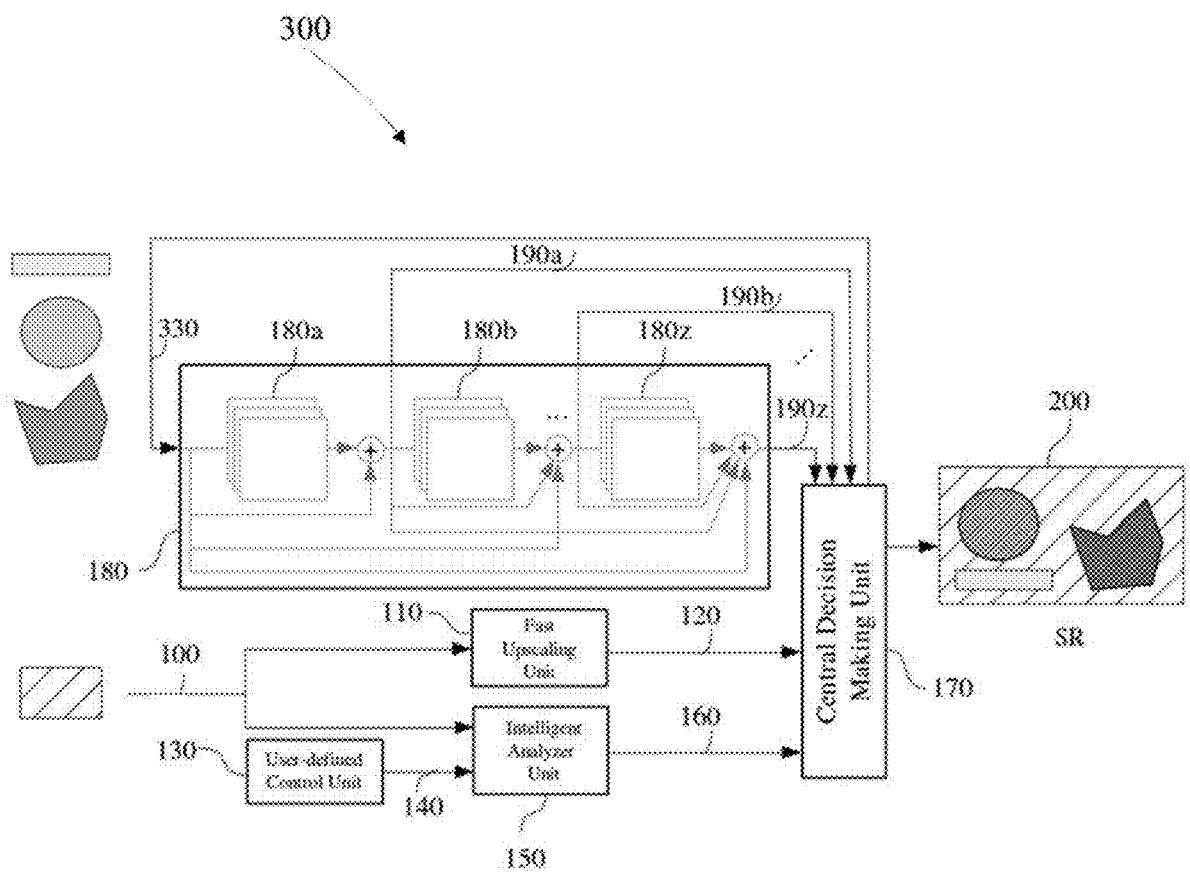
FIG. 3 is an example block diagram illustrating an adaptive region of interest image enhancement techniques in accordance with one embodiment of the disclosure.

FIG. 3 illustrates an example block diagram illustrating an implementation of adaptive region of interest image enhancement. A low resolution image 100 or a frame from a low resolution video is input into the system and is routed to a fast upscaling unit 110 where the image is up-sampled. The fast upscaling unit 110 outputs an enhanced image 120 of upscaling unit wherein the size of the output image is similar to the size of the selectively resolution enhanced image. User-defined rules are input for a specific application into a user defined control unit 130. The decision metrics and user defined control signals 140 are output from the user defined control unit 130. An intelligent analyzer unit 150 receives low resolution image 100, pairs of class IDs and their priorities, based on user-defined rules, and their corresponding regions of interest with their detection confidence scores and outputs 160 regions of interest, their ranked class IDs and their confidence scores. Central decision unit 170 receives the output 120 from the fast upscaling unit 110 and the output 160 of the intelligent analyzer unit 150 and balances an optimization between the intended user experience and the hardware resources to achieve the optimal performance.

The central decision unit 170 outputs a spatial mapping 330 for the regions of interest in a final selectively resolution enhanced image. Deep learning neural network model 180 may be trained based on a large data set and generates different levels of details to be used in different regions of the final selectively resolution enhanced image. The deep learning neural network 180 may comprise convolution, deconvolution, sub-pixel or other computational layers. Modules 180a . . . 180z within the deep neural network may be separately implemented on hardware or software. The modularized design allows the unit to adaptively decide which part of the network to be used for specific region. Residuals 190a . . . 190z are added to the selectively resolution enhanced image through the central decision unit 170. Without the addition of the residuals, the resultant selectively resolution enhanced image is the output of the fast upscaling unit 110. The central decision unit 170 decides which region of interest to enhance and how many details to add to the final image. The disclosure depicts the resolution enhancement as adaptive in the sense of being able to have different resolutions for different regions of the image in a cumulative structure without having redundant parallel computation. One of the outputs of the central decision unit 170 is the selectively enhanced image 200.

Figure 4:
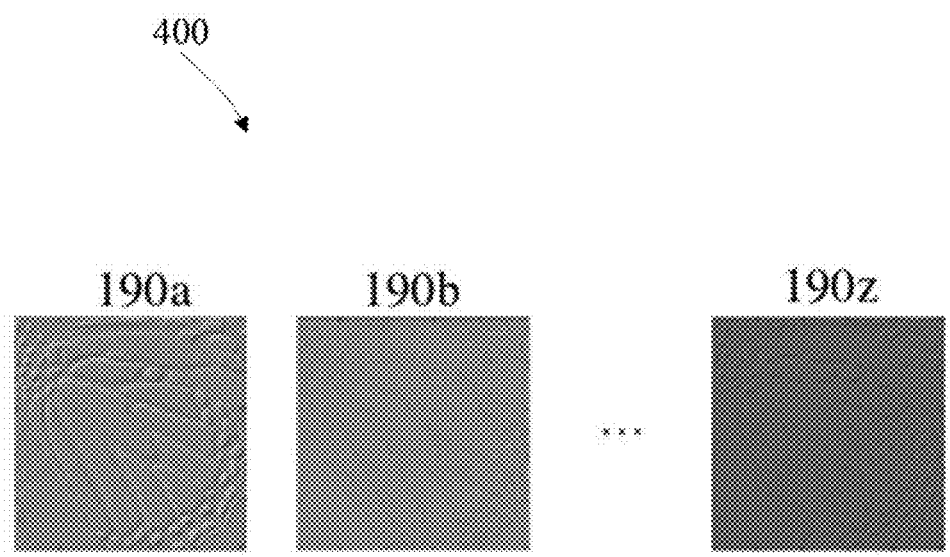
FIG. 4 illustrates example outputs of the adaptive image enhancement in accordance with one embodiment of the disclosure.

FIG. 4 depicts illustrates example outputs of the adaptive image enhancement, the residuals 190a through 190z which are added to the selectively resolution enhanced image through the central decision unit 170 from FIG. 3.

Figure 5:
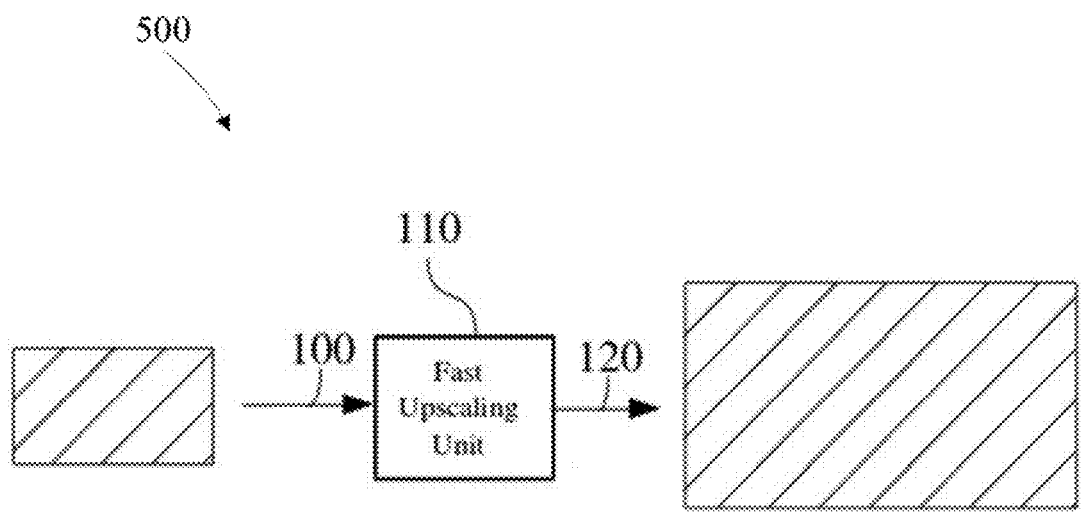
FIG. 5 is an example graphical diagram of upscaling low resolution input to high resolution output via a hardware based selective upscaling algorithm in accordance with one embodiment of the disclosure.

FIG. 5 illustrates an example graphical diagram of upscaling low resolution input to high resolution output via a hardware based selective upscaling algorithm. The fast upscaling unit 110 receives a low resolution image 100 and outputs an enhanced image 120.

Figure 6:
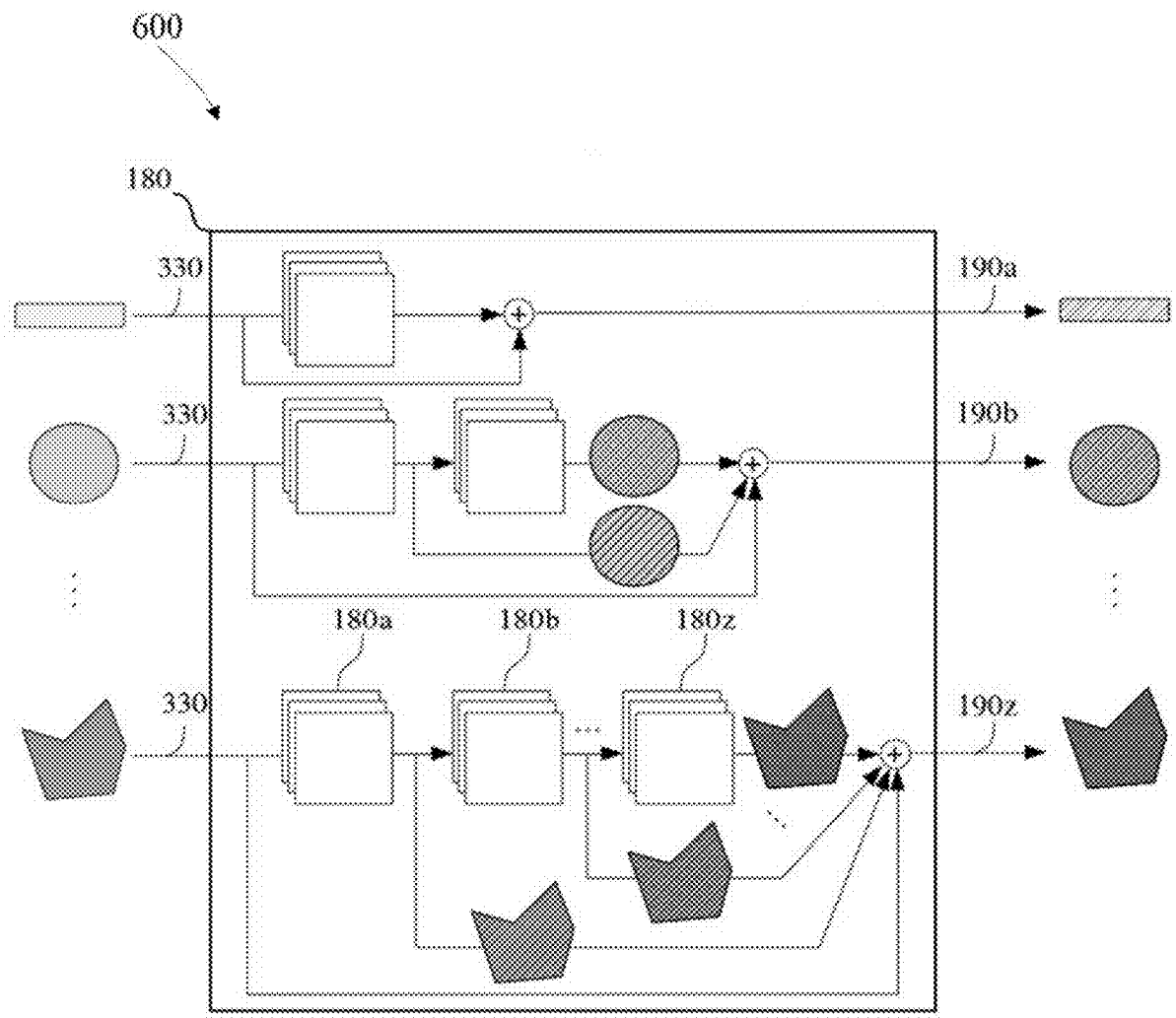
FIG. 6 is an example block diagram in further detail of core enhancement selective upscaling of adding different levels of details to selected regions of interest based the central decision in accordance with one embodiment of the disclosure.

FIG. 6 shows an example block diagram in further detail of the core enhancement selective upscaling of adding different levels of details to selected regions of interest based the central decision and implemented by a neural network. The central decision unit 170 of FIG. 3 outputs a spatial mapping 330 for the regions of interest in a final selectively resolution enhanced image. The neural network model 180 comprises in part modules 180a . . . 180z within the neural network which may be separately implemented in hardware or software. Residuals 190a . . . 190z are added to the selectively resolution enhanced image through the central decision unit 170 of FIG. 3.

Figure 7:
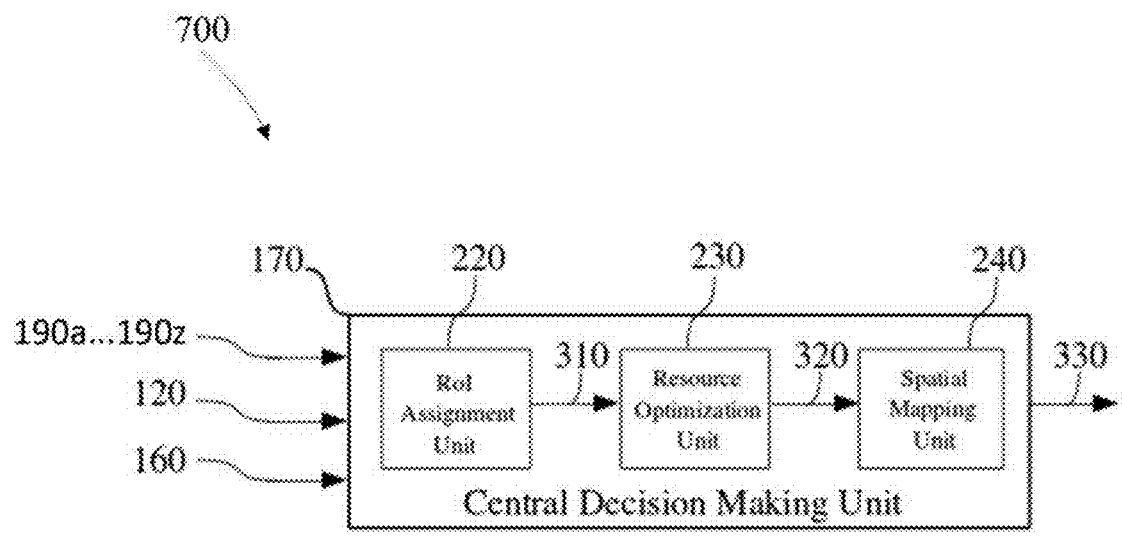
FIG. 7 is an example block diagram of the central decision making unit having user-defined input, intelligent analyzer control signals and generating an enhanced image based on regions of interest in accordance with one embodiment of the disclosure.

FIG. 7 depicts an example block diagram of the central decision making unit having user-defined input, intelligent analyzer control signals and generating an enhanced image based on regions of interest. The central decision unit 170 of FIG. 3 receives output 120 from the fast upscaling unit 110 of FIG. 3, the output 160 of regions of interest from the intelligent analyzer unit 150 of FIG. 3 and residuals 190a . . . 190z from the neural network 180 of FIG. 3. Region of interest assignment unit 220 outputs a ranking 310 of the regions of interest. Resource optimization unit 230 receives the output 310 from the region of interest assignment unit 220 and adds the user-defined constrains to it in an iterative manner, until an optimal scenario is determined in which higher priority regions are resolution enhanced while remaining within the time budget of the application. The selected and prioritized regions 320 of interest are outputted from the resource optimization unit 230. Spatial mapping unit 240 maps the selected regions of interest to selectively enhance the image and outputs a spatial mapping 330 for the regions of interest for a final selectively resolution enhanced image.

Figure 8:
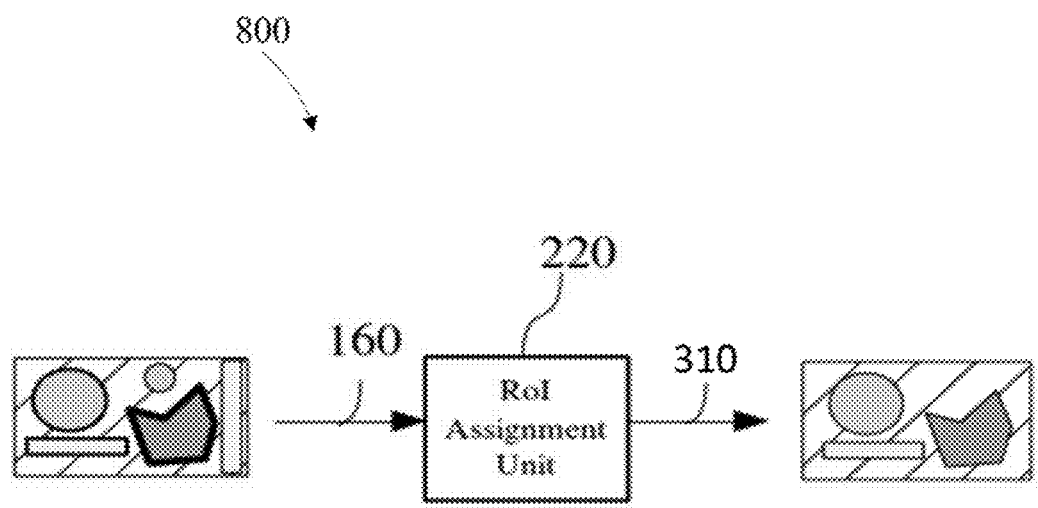
FIG. 8 is an example graphical diagram of assigning which regions of interest considered for selective image enhancement their priorities in accordance with one embodiment of the disclosure.

FIG. 8 illustrates an example graphical diagram of assigning which regions of interest considered for selective image enhancement based on prioritization. Region of interest assignment unit 220 receives the regions of interest 160 from the intelligent analyzer unit 150 of FIG. 3, and outputs a ranking 310 of the regions of interest.

Figure 9:
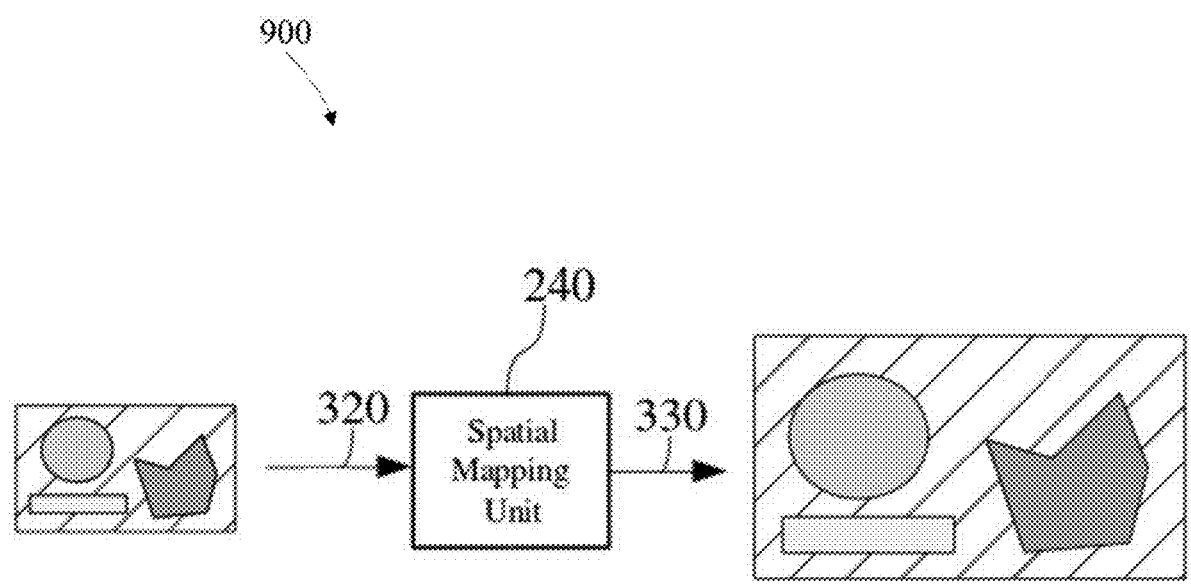
FIG. 9 is an example graphical diagram of mapping the selected regions of interest in the high resolution output image in accordance with one embodiment of the disclosure.

FIG. 9 shows an example graphical diagram of mapping the selected regions of interest in the high resolution output image. Spatial mapping unit 240 receives the selected and prioritized regions of interest 320 and outputs a spatial mapping 330 for the regions of interest in a final selectively resolution enhanced image.

Figure 10:
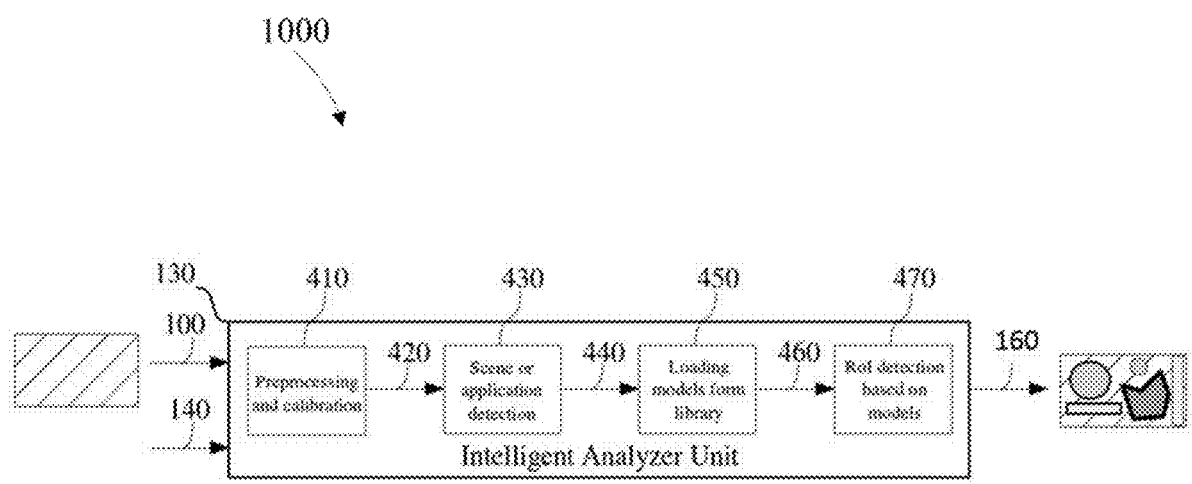
FIG. 10 is an example block diagram of detecting regions of interest and their rank based on the application in accordance with one embodiment of the disclosure.

FIG. 10 depicts an example block diagram of detecting regions of interest and their rank, based on an application. The intelligent analyzer unit 130 includes preprocessor and calibrator 410, receives a low resolution image 100, decision metrics and user defined control signal 140. Scene or application detection unit 430 receives a prepared image 420 and outputs categories or rules 440 pertaining to that image. A library of pre-trained models 450 are loaded for the detection task, the library receives the categories or rules 440 and outputs either information or a control signal 460 of the selected model. A region of interest detector 470 receives the information or control signal 460 and outputs regions of interest 160 based on the library models. The region of interest detection module 470 uses the info from loaded models and detects desired regions of interest.

Figure 11:
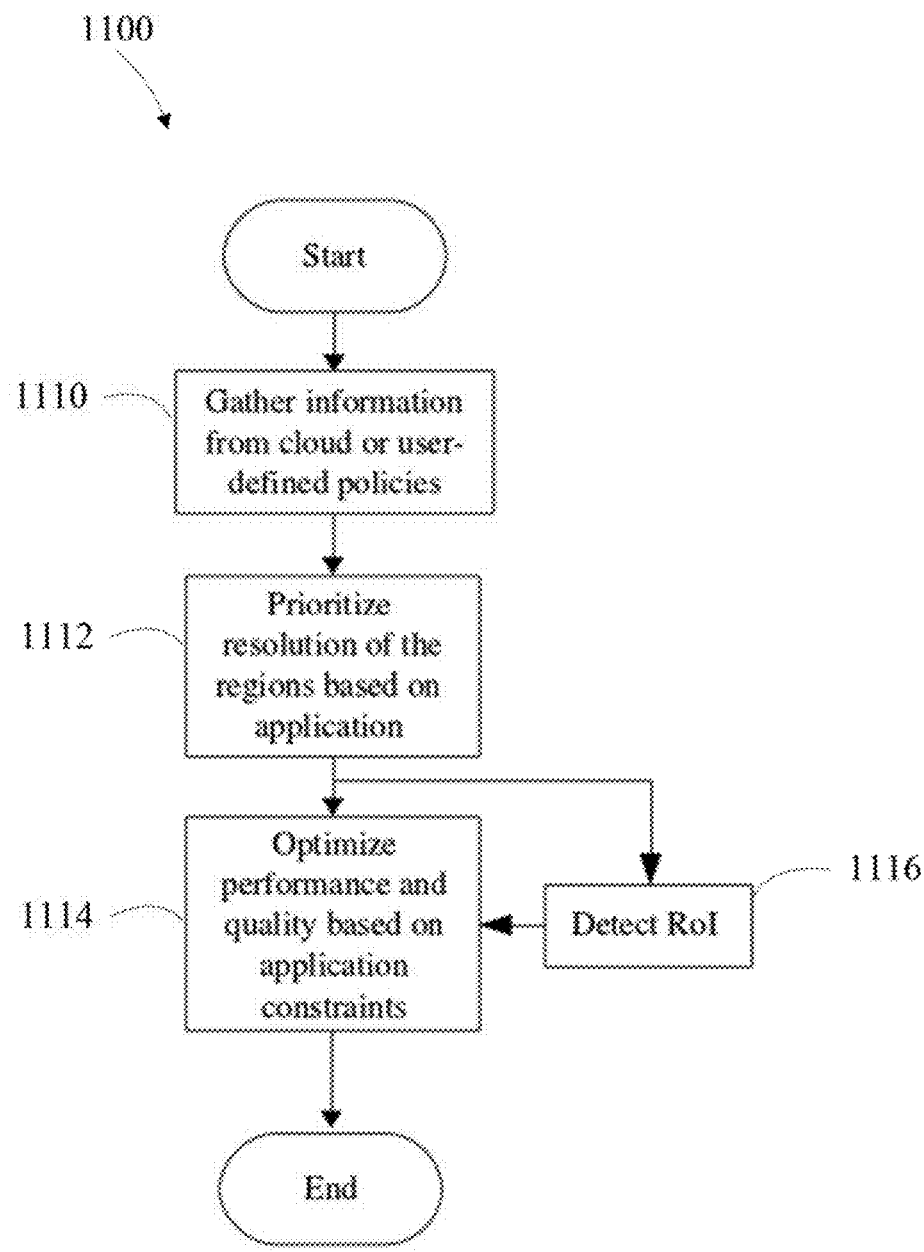
FIG. 11 is an example flow chart of in accordance with some embodiments of the invention to intelligently enhance the output image quality in accordance with one embodiment of the disclosure.

FIG. 11 illustrates an example flow chart of in accordance with some embodiments of the invention to selectively enhance the output image quality. The method gathers 1110 information from cloud or user defined policies, prioritizes 1112 resolution of the regions based on the application in use, detects a region of interest 1116 and optimizes 1114 performance and quality based on application constraints.

Figure 12:
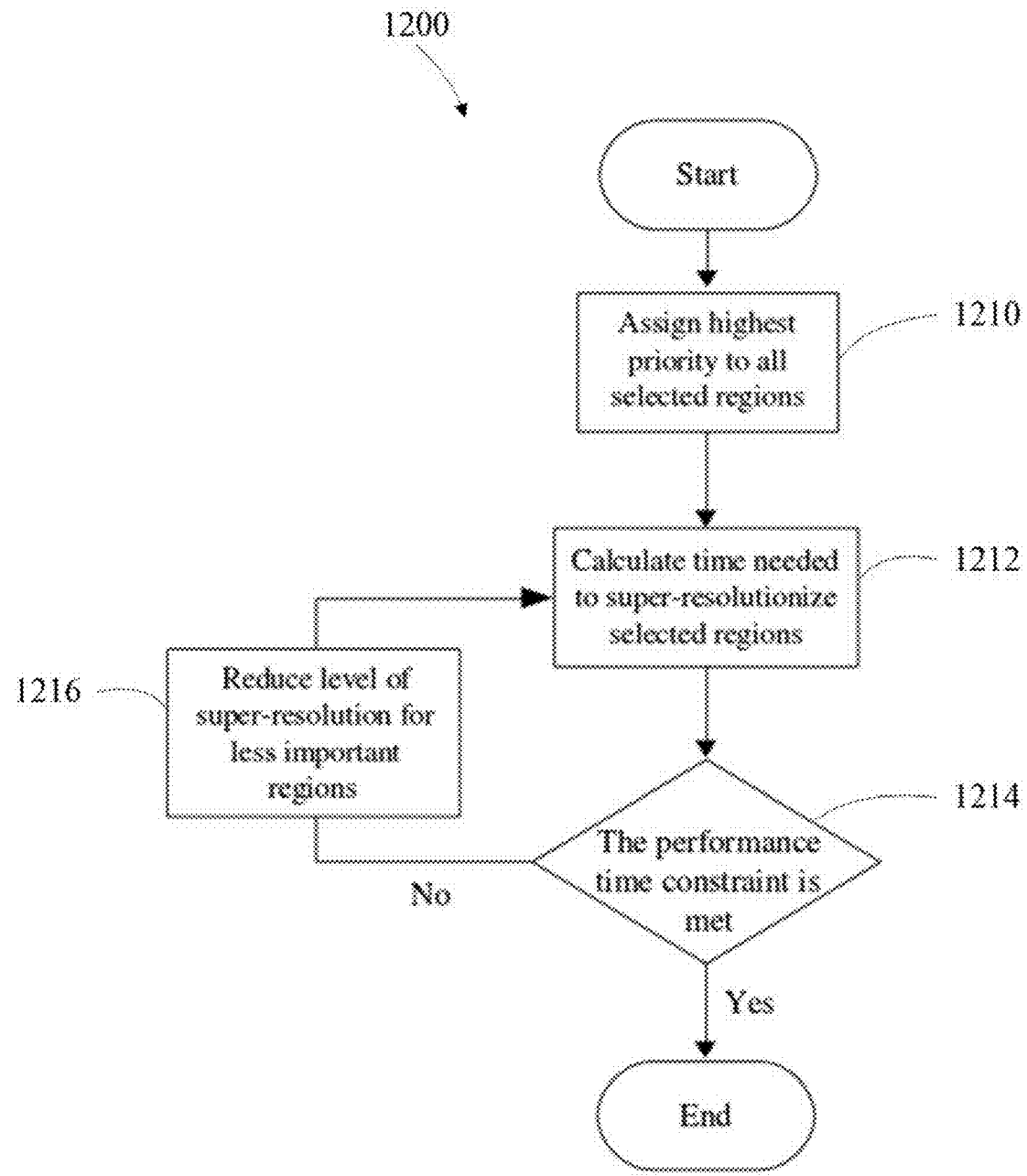
FIG. 12 is an example flowchart of the optimization process in accordance with one embodiment of the disclosure.

FIG. 12 shows an example flowchart of the optimization process. In this method a high priority is assigned 1210 to each of the selected regions of interest, a time needed to resolution enhance a region is determined 1212, and a check performed to determine 1214 whether the time constraint has been met. If not, the level of image enhancement is reduced 1216 for regions of lower priority.

Figure 13:
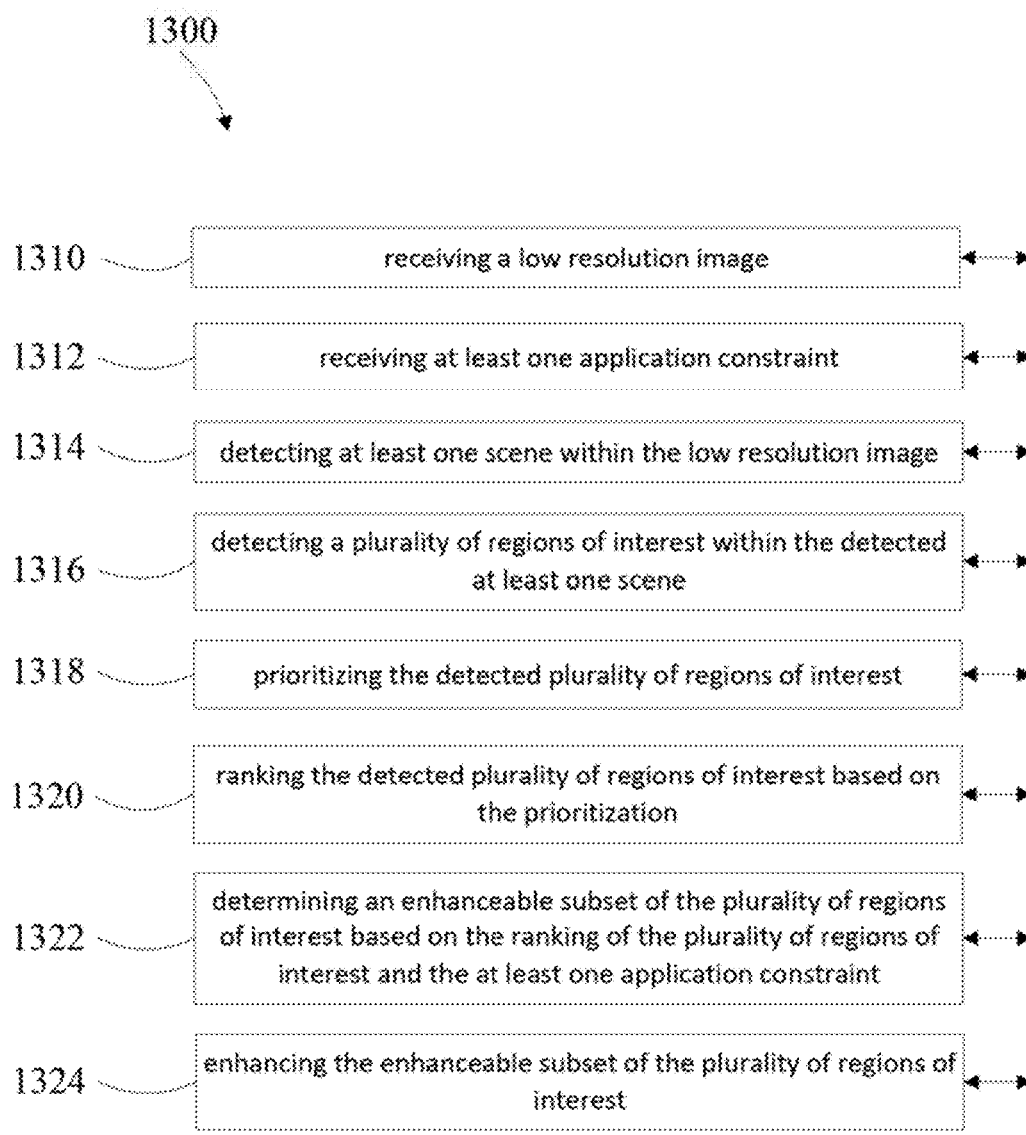
FIG. 13 is a first example method of adaptive image enhancement in accordance with one embodiment of the disclosure.

FIG. 13 illustrates an example method of adaptive image enhancement, comprising, receiving 1310 a low resolution image, receiving 1312 at least one application constraint, detecting 1314 at least one scene within the low resolution image and detecting 1316 a plurality of regions of interest within the detected at least one scene. The method then performs the tasks of prioritizing 1318 the detected plurality of regions of interest, ranking 1320 the detected plurality of regions of interest based on the prioritization, determining 1322 an enhanceable subset of the plurality of regions of interest based on the ranking of the plurality of regions of interest and the at least one application constraint and enhancing 1324 the enhanceable subset of the plurality of regions of interest.

Wherein the at least one application constraint may be a time constraint. The method may also include calculating residuals for the plurality of regions of interest, mapping the enhanced subset of the plurality of regions of interest and adding the mapped enhanced subset of the plurality of regions of interest to the low resolution image.

Figure 14:
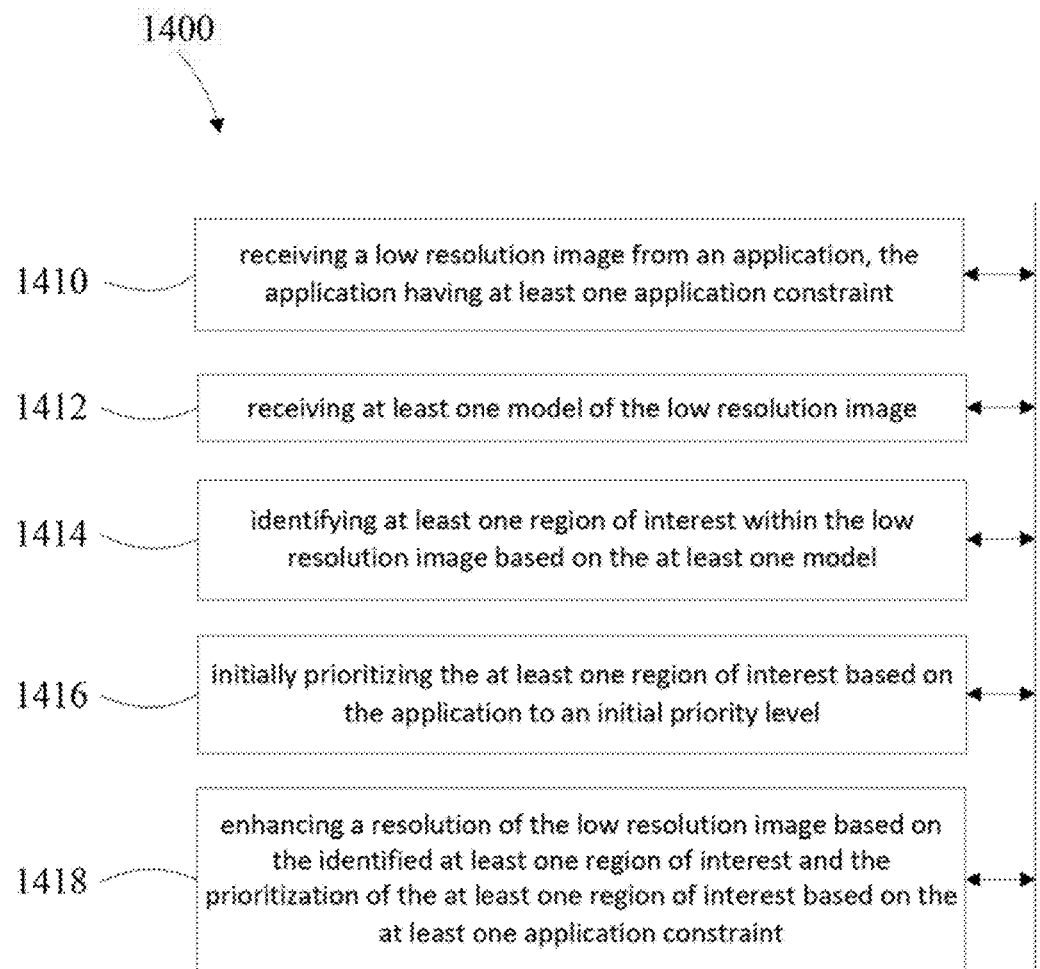
FIG. 14 is a second example method of adaptive image enhancement in accordance with one embodiment of the disclosure.

FIG. 14 illustrates an example method of adaptive image enhancement, comprising, receiving 1410 a low resolution image from an application, the application having at least one application constraint, receiving 1412 at least one model of the low resolution image and identifying 1414 at least one region of interest within the low resolution image based on the at least one model. The method then performs the tasks of initially prioritizing 1416 the at least one region of interest based on the application to an initial priority level and enhancing 1418 a resolution of the low resolution image based on the identified at least one region of interest and the prioritization of the at least one region of interest based on the at least one application constraint.

The method may also include reassigning the initial priority level of the identified at least one region of interest to an enhanced test priority level, determining an enhancement time based on the enhanced test priority level, determining whether a time constraint of the at least one application constraint is met and if the time constraint is not met, then reducing the enhanced test priority level of a lower initial priority level region of interest until the time constraint is met, wherein the reducing of the enhanced test priority level may be based on the ranking of the at least one region of interest.

The model of the low resolution image may be pre-trained, the identification of the at least one region of interest may be based on the pre-trained model, the at least one application constraint may be based on at least one of a cloud defined policy and a user defined policy and the resolution enhancement of the low resolution image may be hardware based.

The method may also include ranking the at least one region of interest based on the initial priority level, spatially mapping the low resolution image to a high resolution image, pre-processing the low resolution image and detecting a scene based on the low resolution image and modeling the low resolution image based on the detected scene.

Figure 15:
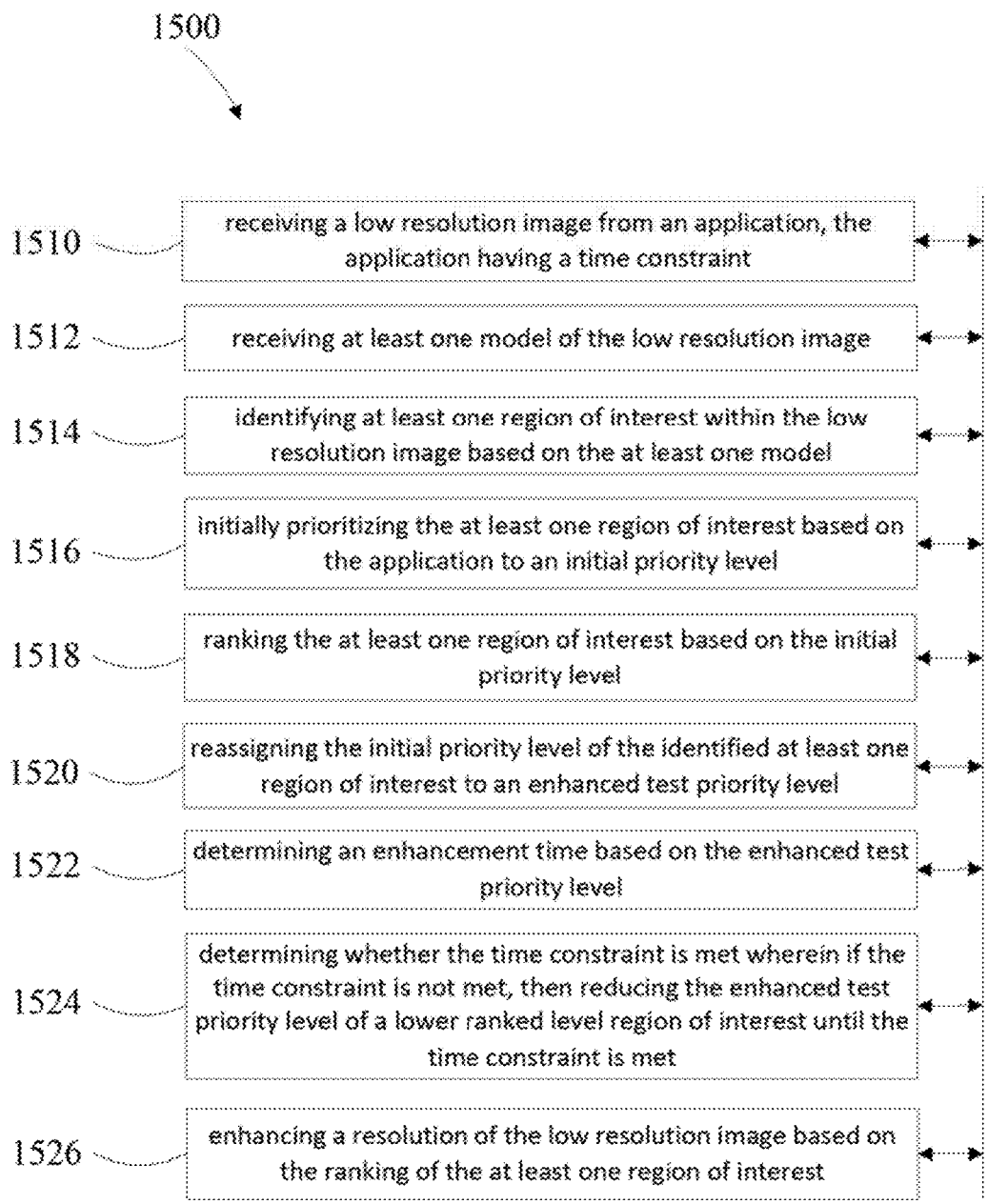
FIG. 15 is a third example method of adaptive image enhancement in accordance with one embodiment of the disclosure.

FIG. 15 illustrates an example method of adaptive image enhancement, comprising receiving 1510 a low resolution image from an application, the application having a time constraint, receiving 1512 at least one model of the low resolution image and identifying 1514 at least one region of interest within the low resolution image based on the at least one model. The method also includes the tasks of initially prioritizing 1516 the at least one region of interest based on the application to an initial priority level, ranking 1518 the at least one region of interest based on the initial priority level, reassigning 1520 the initial priority level of the identified at least one region of interest to an enhanced test priority level and determining 1522 an enhancement time based on the enhanced test priority level. The method further includes determining 1524 whether the time constraint is met wherein if the time constraint is not met, then reducing the enhanced test priority level of a lower ranked level region of interest until the time constraint is met and enhancing 1526 a resolution of the low resolution image based on the ranking of the at least one region of interest.

The method may also include detecting a scene based on the low resolution image and modeling the low resolution image based on the detected scene, where the model of the low resolution image is pre-trained and where the identification of the at least one region of interest is based on a neural network model.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of adaptive image enhancement, comprising:
   receiving a low resolution image from an application, the application having at least one application constraint;
   receiving at least one model of the low resolution image;
   identifying at least one region of interest within the low resolution image based on the at least one model;
   initially prioritizing the at least one region of interest based on the application to an initial priority level; and
   enhancing a resolution of the low resolution image based on the identified at least one region of interest and the prioritization of the at least one region of interest based on the at least one application constraint;
   reassigning the initial priority level of the identified at least one region of interest to an enhanced test priority level;
   determining an enhancement time based on the enhanced test priority level;
   determining whether a time constraint of the at least one application constraint is met, if the time constraint is not met, then reducing the enhanced test priority level of a lower initial priority level region of interest until the time constraint is met; and
   ranking the at least one region of interest based on the initial priority level wherein the reducing of the enhanced test priority level is based on the ranking of the at least one region of interest.

2. The method of adaptive image enhancement of claim 1, further comprising:
   at least one more region of interest forming a plurality of regions of interest;
   spatially mapping the plurality of low resolution images to the plurality of high resolution images;
   calculation of residuals for the plurality of low resolution images;
   addition of calculated residuals for the plurality of low resolution images to the enhanced subset of the plurality of regions of interest according the mapping to the plurality of high resolution region.

3. The method of adaptive image enhancement of claim 1, further comprising pre-processing the low resolution image.

4. The method of adaptive image enhancement of claim 1, further comprising detecting a scene based on the low resolution image and modeling the low resolution image based on the detected scene.

5. The method of adaptive image enhancement of claim 1, wherein the model of the low resolution image is pre-trained.

6. The method of adaptive image enhancement of claim 5, wherein the identification of the at least one region of interest is based on the pre-trained model.

7. The method of adaptive image enhancement of claim 1, wherein the at least one application constraint is based on at least one of a cloud defined policy and a user defined policy.

8. The method of adaptive image enhancement of claim 1, wherein the resolution enhancement of the low resolution image is hardware based.

9. A method of adaptive image enhancement, comprising:
   receiving a low resolution image from an application, the application having a time constraint;
   receiving at least one model of the low resolution image;
   identifying at least one region of interest within the low resolution image based on the at least one model;
   initially prioritizing the at least one region of interest based on the application to an initial priority level;
   ranking the at least one region of interest based on the initial priority level;
   reassigning the initial priority level of the identified at least one region of interest to an enhanced test priority level;
   determining an enhancement time based on the enhanced test priority level;
   determining whether the time constraint is met, if the time constraint is not met, then reducing the enhanced test priority level of a lower ranked level region of interest until the time constraint is met; and
   enhancing a resolution of the low resolution image based on the ranking of the at least one region of interest.

10. The method of adaptive image enhancement of claim 9, further comprising detecting a scene based on the low resolution image and modeling the low resolution image based on the detected scene, wherein the model of the low resolution image is pre-trained.

11. The method of adaptive image enhancement of claim 9, wherein the identification of the at least one region of interest is based on a neural network model.

* * * * *